(12) United States Patent
Rahardjo et al.

(10) Patent No.: US 10,013,563 B2
(45) Date of Patent: Jul. 3, 2018

(54) SYSTEMS AND METHODS FOR BINDING A REMOVABLE CRYPTOPROCESSOR TO AN INFORMATION HANDLING SYSTEM

(71) Applicant: Dell Products L.P., Round Rock, TX (US)

(72) Inventors: Johan Rahardjo, Austin, TX (US); Mukund Purshottam Khatri, Austin, TX (US); Vaden Albert Mohrmann, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 14/040,995

(22) Filed: Sep. 30, 2013

(65) Prior Publication Data

US 2015/0095631 A1    Apr. 2, 2015

(51) Int. Cl.
  *G06F 21/00* (2013.01)
  *G06F 21/60* (2013.01)
  *G06F 9/4401* (2018.01)
  *G06F 21/44* (2013.01)
  *G06F 21/72* (2013.01)

(52) U.S. Cl.
  CPC .......... *G06F 21/602* (2013.01); *G06F 9/4403* (2013.01); *G06F 21/445* (2013.01); *G06F 21/72* (2013.01)

(58) Field of Classification Search
  None
  See application file for complete search history.

(56) References Cited

U.S. PATENT DOCUMENTS

| | | | | |
|---|---|---|---|---|
| 5,355,489 A * | 10/1994 | Bealkowski | .......... | G06F 13/409 713/2 |
| 7,117,376 B2 * | 10/2006 | Grawrock | ...................... | 380/277 |
| 7,248,691 B1 * | 7/2007 | Pandit | .................. | H04L 9/0643 380/273 |
| 7,269,725 B2 * | 9/2007 | Cromer | ................... | G06F 1/183 711/164 |
| 7,272,723 B1 * | 9/2007 | Abbott | ..................... | G06F 21/00 709/223 |
| 7,437,568 B2 * | 10/2008 | Das-Purkayastha | .. | G06F 21/552 380/277 |
| 7,490,250 B2 * | 2/2009 | Cromer | ................. | G06F 21/554 713/194 |
| 8,055,912 B2 * | 11/2011 | Bade | ..................... | G06F 21/575 713/193 |
| 8,150,039 B2 * | 4/2012 | de Cesare | ............. | G06F 21/575 380/277 |

(Continued)

*Primary Examiner* — Maung T Lwin
(74) *Attorney, Agent, or Firm* — Jackson Walker L.L.P.

(57) ABSTRACT

In accordance with these and other embodiments of the present disclosure, an information handling system may include a processor and a basic input/output system (BIOS) including a program of instructions. The BIOS may be configured to, when read and executed by the processor, calculate a binding secret for binding a cryptoprocessor to a motherboard of the information handling system, the binding secret based on unique identifying information of both the cryptoprocessor and the motherboard, store the binding secret in a non-volatile memory integral to the cryptoprocessor, and validate binding of the cryptoprocessor to the motherboard by comparing a subsequently-calculated binding secret to the binding secret.

23 Claims, 3 Drawing Sheets

(56) References Cited

U.S. PATENT DOCUMENTS

| | | | | |
|---|---|---|---|---|
| 8,166,308 B2* | 4/2012 | Smith | G06F 21/575 | 463/29 |
| 8,505,103 B2* | 8/2013 | Song | G06F 21/53 | 705/51 |
| 8,516,269 B1* | 8/2013 | Hamlet | G06F 21/445 | 340/5.8 |
| 8,645,711 B2* | 2/2014 | Ohhashi | G06F 21/57 | 713/187 |
| 2002/0087877 A1* | 7/2002 | Grawrock | G06F 21/575 | 726/26 |
| 2003/0037237 A1* | 2/2003 | Abgrall | G06F 21/53 | 713/166 |
| 2005/0039016 A1* | 2/2005 | Aissi | H04L 63/0823 | 713/176 |
| 2005/0138345 A1* | 6/2005 | Cromer | G06F 1/183 | 713/2 |
| 2005/0138399 A1* | 6/2005 | Cheston | G06F 21/31 | 713/189 |
| 2005/0204156 A1* | 9/2005 | Chang | 713/200 | |
| 2005/0289343 A1* | 12/2005 | Tahan | 713/169 | |
| 2006/0026419 A1* | 2/2006 | Arndt | G06F 21/57 | 713/150 |
| 2007/0006169 A1* | 1/2007 | Iliev | G06F 21/57 | 717/131 |
| 2007/0101156 A1* | 5/2007 | Novoa | G06F 21/575 | 713/190 |
| 2007/0124798 A1* | 5/2007 | Dennis | 726/2 | |
| 2007/0157028 A1* | 7/2007 | Lott | G06F 21/31 | 713/182 |
| 2007/0255948 A1* | 11/2007 | Ali | G06F 21/57 | 713/164 |
| 2008/0010218 A1* | 1/2008 | Zank | G06F 21/64 | 705/75 |
| 2008/0028235 A1* | 1/2008 | Smith et al. | 713/190 | |
| 2008/0141037 A1* | 6/2008 | Cheston et al. | 713/184 | |
| 2008/0184040 A1* | 7/2008 | Bade | G06F 21/572 | 713/189 |
| 2008/0276326 A1* | 11/2008 | Bhansali et al. | 726/36 | |
| 2009/0049514 A1* | 2/2009 | Yan | G06F 21/445 | 726/1 |
| 2009/0202068 A1* | 8/2009 | Qureshi | H04L 9/0838 | 380/44 |
| 2010/0037063 A1* | 2/2010 | Chontos et al. | 713/185 | |
| 2010/0235648 A1* | 9/2010 | Hoang et al. | 713/189 | |
| 2011/0010561 A1* | 1/2011 | Osaki | H04L 9/088 | 713/189 |
| 2011/0040961 A1* | 2/2011 | Badaoui-Najjar | G06F 21/57 | 713/2 |
| 2011/0093689 A1* | 4/2011 | Pant et al. | 713/2 | |
| 2011/0093693 A1* | 4/2011 | Ibrahim | G06F 21/57 | 713/2 |
| 2011/0099627 A1* | 4/2011 | Proudler | G06F 21/57 | 726/21 |
| 2011/0246756 A1* | 10/2011 | Smith | H04L 9/3252 | 713/2 |
| 2011/0314290 A1* | 12/2011 | Fort | G06F 21/31 | 713/176 |
| 2012/0131322 A1* | 5/2012 | Smith | G06F 21/575 | 713/2 |
| 2012/0159575 A1* | 6/2012 | Fukui | H04L 9/0844 | 726/3 |
| 2012/0233706 A1* | 9/2012 | O'Connor et al. | 726/30 | |
| 2013/0061031 A1* | 3/2013 | Pant | G06F 21/606 | 713/2 |
| 2013/0268749 A1* | 10/2013 | Blankenbeckler | H04L 9/08 | 713/153 |
| 2013/0343538 A1* | 12/2013 | Mizikovsky | H04W 12/06 | 380/255 |

* cited by examiner ated into an information handling system, the cryptoprocessor may be part of the core root of trust of the information handling system to ensure that the information handling system operates in a secure state, allowing it to remotely attest that the platform can be trusted.
SYSTEMS AND METHODS FOR BINDING A REMOVABLE CRYPTOPROCESSOR TO AN INFORMATION HANDLING SYSTEM

TECHNICAL FIELD

The present disclosure relates generally to information handling systems and, more particularly, to a system and method for binding a removable cryptoprocessor to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ data encryption when storing and transmitting data in order to protect the data from being accessed by unauthorized persons. To accomplish such encryption, many information handling systems employ cryptoprocessors to provide secure generation and storage of cryptographic keys, the ability to limit the use of keys (e.g., to signing/verification or encryption/decryption), and other secure tasks. An example of a cryptoprocessor is a Trusted Platform Module (TPM)-compliant with the trusted Computing Group standard. When integrated into an information handling system, the cryptoprocessor may be part of the core root of trust of the information handling system to ensure that the information handling system operates in a secure state, allowing it to remotely attest that the platform can be trusted.

A challenge in manufacturing information handling systems with cryptoprocessors is that multiple system configurations may be required or desired by end users during a life cycle of a particular model of information handling system for various reasons, including introduction of new cryptoprocessor standards which may not be backwards compatible, geographic restrictions on cryptoprocessor functionality, and/or other reasons.

To avoid producing multiple different motherboards for supporting various cryptoprocessor-driven configurations, it may be desirable that the cryptoprocessor be a removable modular plug-in module that interfaces with an information handling system motherboard. With a plug-in module cryptoprocessor implementation, to satisfy various requirements of relevant standards (e.g., TPM standard) an effective mechanism for binding the cryptoprocessor to the motherboard must exist. Traditionally, such binding has been achieved by soldering the cryptoprocessor to the motherboard, which is not possible if a plug-in module is desired.

Existing solutions to this problem have disadvantages. For example, some manufacturers have created custom cryptoprocessor firmware, but this may not be an effective solution as it may not be fully compliant with applicable standards.

SUMMARY

In accordance with the teachings of the present disclosure, certain disadvantages and problems associated with binding a removable cryptoprocessor to an information handling system may be substantially reduced or eliminated.

In accordance with these and other embodiments of the present disclosure, an information handling system may include a processor and a basic input/output system (BIOS) comprising a program of instructions. The BIOS may be configured to, when read and executed by the processor, calculate a binding secret for binding a cryptoprocessor to a motherboard of the information handling system, the binding secret based on unique identifying information of both the cryptoprocessor and the motherboard, store the binding secret in a non-volatile memory integral to the cryptoprocessor, and validate binding of the cryptoprocessor to the motherboard by comparing a subsequently-calculated binding secret to the binding secret.

In accordance with these and other embodiments of the present disclosure, a method may include calculating a binding secret for binding a cryptoprocessor to a motherboard of an information handling system, the binding secret based on unique identifying information of both the cryptoprocessor and the motherboard. The method may also include storing the binding secret in a non-volatile memory integral to the cryptoprocessor. The method may further include validating binding of the cryptoprocessor to the motherboard by comparing a subsequently-calculated binding secret to the binding secret.

In accordance with these and other embodiments of the present disclosure, an article of manufacture may include a non-transitory computer-readable medium and computer-executable instructions carried on the computer-readable medium wherein the instructions are readable by a processor. The instructions, when read and executed, may cause the processor to calculate a binding secret for binding a cryptoprocessor to a motherboard of an information handling system, the binding secret based on unique identifying information of both the cryptoprocessor and the motherboard, store the binding secret in a non-volatile memory integral to the cryptoprocessor, and validate binding of the cryptoprocessor to the motherboard by comparing a subsequently-calculated binding secret to the binding secret.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
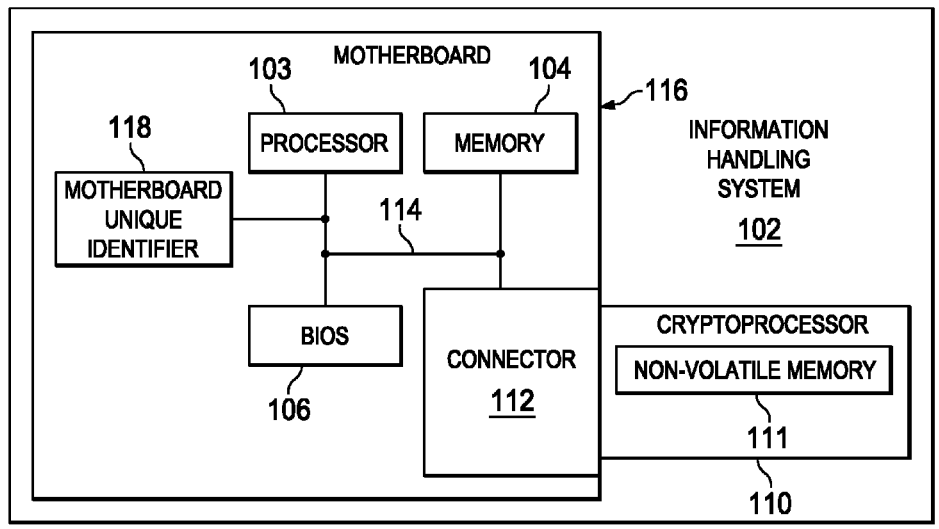
FIG. 1 illustrates a block diagram of an example information handling system, in accordance with embodiments of the present disclosure.

FIG. 1 illustrates a block diagram of an example information handling system 102, in accordance with embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory 104 communicatively coupled to processor 103, a basic input/output system (BIOS) 106 communicatively coupled to processor 103, a cryptoprocessor 110 communicatively coupled to processor 103 and BIOS 106 via a connector 112, a communication bus 114, and a motherboard unique identifier 118. BIOS 106 and/or certain other components of information handling system 102 may be fixedly mounted (e.g., soldered) to a motherboard 116, while cryptoprocessor 110 and other components may be removably mounted to motherboard 116 via a corresponding connector (e.g., connector 112). While certain components (e.g., memory 104, processor 103) of information handling system 102 are not explicitly shown to be coupled to motherboard 116 via a corresponding connector, in some embodiments some of such components may be modular in nature and removably coupled to motherboard 116 via a corresponding connector.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, BIOS 106, and/or another component of information handling system 102.

Memory 104 may be communicatively coupled to processor 103 (e.g., via communication bus 114) and may comprise any system, device, or apparatus configured to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

BIOS 106 may be communicatively coupled to processor 103 (e.g., via communication bus 114) and may comprise any system, device, or apparatus configured to store instructions to be executed by processor 103 when information handling system 102 is booted and/or powered on. In some embodiments, BIOS 106 may be boot firmware and may be configured to be the first code executed by processor 103 when information handling system 102 is booted and/or powered on. The initial function of BIOS 106 may be to identify, test, and initialize components of information handling system 102 (e.g., video display cards, storage resources, and other hardware). As part of such initialization, BIOS code may be configured to set components of information handling system 102 into a known state, so that software (e.g., an operating system) stored on compatible media can be loaded into memory 104, executed by processor 103, and given control of information handling system 102. In some embodiments, BIOS 106 may comprise a Unified Extensible Firmware Interface (UEFI).

Cryptoprocessor 110 may be communicatively coupled to processor 103 and/or BIOS 106 (e.g., via connector 112 and communication bus 114) and may include any system, device, or apparatus configured to carry out cryptographic operations on data communicated to it from processor 103, BIOS 106, and/or another component of information handling system 102. In some embodiments, cryptoprocessor 110 may be compliant with the Trusted Platform Module specification, a successor specification, and/or any other similar specification. In some embodiments, cryptoprocessor 110 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys and/or store keys (e.g., endorsement key, storage root key, attestation identity keys, storage keys).

As depicted in FIG. 1, cryptoprocessor 110 may be removably coupled to connector 112. Accordingly, cryptoprocessor 110 may include an edge connector or other suitable connector configured to mate with connector 112 in order to mechanically couple cryptoprocessor 110 to motherboard 116 and electrically couple cryptoprocessor 110 to communication bus 114.

As shown in FIG. 1, cryptoprocessor 110 may comprise a non-volatile memory 111 accessible only to cryptoprocessor 110. Memory 111 may comprise any system, device, or apparatus configured to retain program instructions or data for a period of time (e.g., computer-readable media). Memory 111 may comprise non-volatile random access memory (NVRAM), EEPROM, a PCMCIA card, flash memory, magnetic storage, opto-magnetic storage, or any suitable selection and/or array of non-volatile memory that retains data after power to information handling system 102 is turned off.

Connector 112 may comprise any system, device, or apparatus fixedly mounted on motherboard 116 and may be constructed to mechanically couple cryptoprocessor 110 to motherboard 116 and to electrically couple cryptoprocessor 110 to communication bus 114 and other components coupled to communication bus 114 (e.g., processor 103, BIOS 106). Connector 112 may include a slot or other opening configured to removably receive a corresponding mating edge connector of cryptoprocessor 110.

Communication bus 114 may comprise any system, device, or apparatus configured to transfer data among components of information handling system 102.

Motherboard 116 may comprise any system, device, or apparatus configured to interconnect information handling resources of information handling system 102 with each other. Accordingly, motherboard 116 may include slots, pads, and/or other connectors configured to receive corresponding electrical connectors of information handling resources in order to electrically couple information handling resources to each other.

Motherboard unique identifier 118 may comprise any alphanumeric string (e.g., a serial number) uniquely identifying motherboard 116 from other motherboards, and may be stored on a read-only memory or other computer-readable medium disposed on motherboard 116.

In addition to processor 103, memory 104, BIOS 106, storage resource 110, cyryptographic processor 110, connector 112, and motherboard 116, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

In operation, BIOS 106 may be configured to, when executed by a processor 103 during start-up/initialization of information handling system 102, perform binding operations to bind cryptoprocessor 110 to motherboard 116 and/or validate the binding of cryptoprocessor 110 to motherboard 116, as is described in greater detail below.

Figure 2:
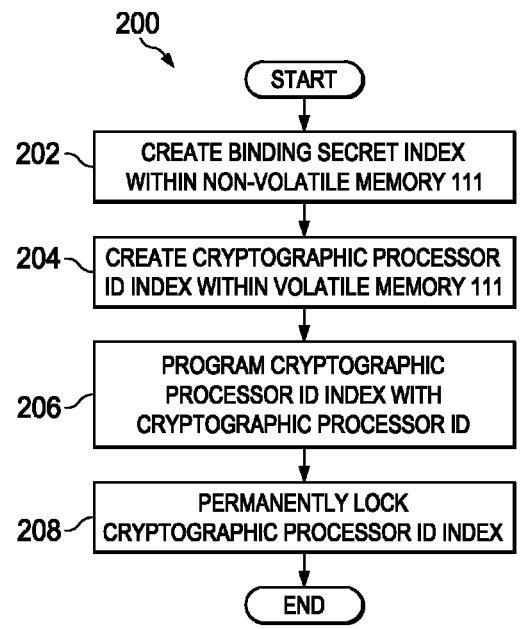
FIG. 2 illustrates a flow chart of an example method for factory provisioning of a cryptographic processor, in accordance with embodiments of the present disclosure.

FIG. 2 illustrates a flow chart of an example method 200 for factory provisioning of a cryptographic processor (e.g., cryptographic processor 110), in accordance with embodiments of the present disclosure. In some embodiments, method 200 may be performed or executed in whole or part by a functional text fixture of a manufacturer or other supplier of information handling system 102 and/or cryptographic processor 110. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a functional test fixture may create a binding secret index within a portion of non-volatile memory 111. Such binding secret index may receive and store a binding secret, as described in greater detail below.

At step 204, the functional test fixture may create a cryptographic processor identifier index within another portion of non-volatile memory 111. Such cryptographic processor identifier index may receive and store a cryptographic processor identifier, as described in greater detail below.

At step 206, the functional test fixture may program the cryptographic processor identifier index with a cryptographic processor identifier. The cryptographic processor identifier may include any value that may uniquely identify a cryptographic processor 110, including a serial number of such cryptographic processor 110, a random number generated by the functional test fixture, a hash generated based on the serial number and the random number, and/or any other suitable identifier.

At step 208, the functional test fixture may permanently lock (e.g., write protect) the value of the cryptographic processor identifier in the cryptographic processor identifier index. In TPM-compliant embodiments, such a persistent lock of the cryptographic processor identifier index may be performed by provisioning cryptographic processor identifier index with TPM_NV_WRITEDEFINE (bit 13) of TPM_NV_ATTRIBUTES. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using any system, device, or apparatus operable to implement method 200. In certain embodiments, method 200 may be implemented partially or fully in software and/or firmware embodied in computer-readable media.

Figure 3:
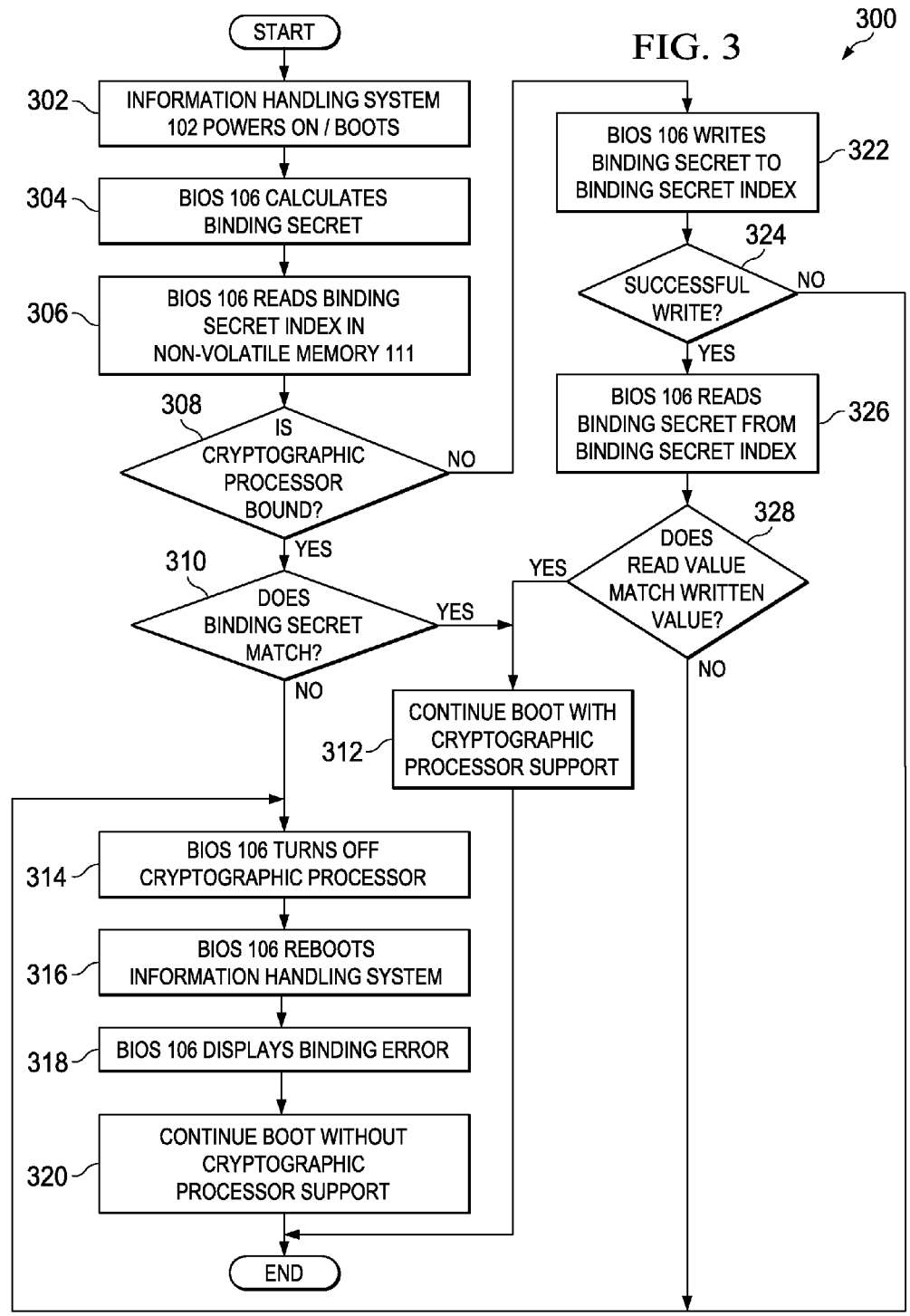
FIG. 3 illustrates a flow chart of an example method for binding verification and binding activation of a cryptographic processor, in accordance with embodiments of the present disclosure.

FIG. 3 illustrates a flow chart of an example method 300 for binding verification and binding activation of a cryptographic processor (e.g., cryptographic processor 110), in accordance with embodiments of the present disclosure. In some embodiments, method 300 may be performed or executed in whole or part by BIOS 106 (executing on processor 103). According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, information handling system 102 may power on and/or boot and processor 103 may load and execute BIOS 106. At step 304, BIOS 106 may calculate a binding secret. In some embodiments, BIOS 106 may calculate the binding secret based on motherboard unique identifier 118 or another component of information handling system and the cryptographic processor identifier (e.g., a hash calculated based on the two values). An example method for calculating the binding secret is set forth in greater detail below with respect to FIG. 4.

At step 306, BIOS 106 may read a previously-stored binding secret value from the binding secret index of non-volatile memory 111. At step 308, BIOS 306 may, based on the value of the previously-stored binding secret value read from the binding secret index or variable stored in non-volatile memory 111, determine if cryptographic processor 110 has been bound to a motherboard. For example, certain values of the previously-stored binding secret value (e.g., all 0's or all 1's) may indicate that cryptographic processor 110 has not been bound to a motherboard. If cryptographic processor 110 has been bound to a motherboard, method 300 may proceed to step 310. Otherwise, if cryptographic processor 110 has not been bound to a motherboard, method 300 may proceed to step 322.

At step 310, BIOS 106 may verify binding of cryptographic processor 110 to motherboard 116 by determining if the value of the previously-stored binding secret matches the calculated binding secret. If the value of the previously-stored binding secret matches the calculated binding secret, method 300 may proceed to step 312. Otherwise, method 300 may proceed to step 314.

At step 312, BIOS 106 may continue booting information handling system 102 with support for cryptographic processor 110. After completion of step 312, method 300 may end.

At step 314, responsive to a determination that the previously-stored binding secret does not match the calculated binding secret (at step 310) or in responsive to unsuccessful binding activation (at steps 324 or 328), BIOS 106 may turn off or otherwise disable cryptographic processor 110. At step 316, BIOS 106 may then reboot information handling system 102. At step 318, after reboot BIOS 106 may display or otherwise provide an alert (e.g., via a display device and/or audio speaker) to a user of information handling 102 indicating that BIOS 106 was unable to bind cryptographic processor 110 to motherboard 116.

At step 320, BIOS 106 may continue booting information handling system 102 without support for cryptographic processor 110. After completion of step 320, method 300 may end.

At step 322, responsive to determining at step 308 that cryptographic processor 110 is not bound to a motherboard, BIOS 106 may activate binding by writing the binding secret to the binding secret index of non-volatile memory 111. In writing the binding secret to the binding secret index, BIOS 106 may write and read protect the binding secret index by a physical presence provision in cryptographic processor 110 that is asserted by BIOS 106 early in its execution. In TPM-compliant embodiments, such a read protection and write protection of the binding secret index may be performed by provisioning the cryptographic processor binding secret index with TPM_NV_PPWRITE (bit 0) and TPM_NV_PREAD (bit 16) of TPM_NV_ATTRIBUTES. In TPM-compliant embodiments, the access protection to each of the binding secret index and the cryptographic processor identifier index may also be performed by defining the binding secret index and the cryptographic processor identifier index with TPM_NV_INDEX entity with the P-bit variable (Platform Manufacturing reserved, bit 30 of TPM_NV_INDEX) set and the D-bit variable (persistent through force clear/owner clear, bit 28 or TPM_NV_INDEX) set.

At step 324, BIOS 106 may determine if the write attempt was successful. If successful, method 300 may proceed to step 326. If unsuccessful, method 300 may proceed to step 314.

At step 326, BIOS 106 may further verify that binding activation was successful by reading the binding secret from the binding secret index, and at step 328 determining whether the value read from the binding secret index is the same as the value written to the binding secret index. If the read value matches the written value, method 300 may proceed to step 312, where BIOS 106 may continue booting information handling system 102 with support for cryptographic processor 110. If the read value does not match the written value, method 300 may proceed to step 314.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using any BIOS 106 or any other system, device, or apparatus operable to implement method 300. In certain embodiments, method 300 may be implemented partially or fully in software and/or firmware embodied in computer-readable media.

Figure 4:
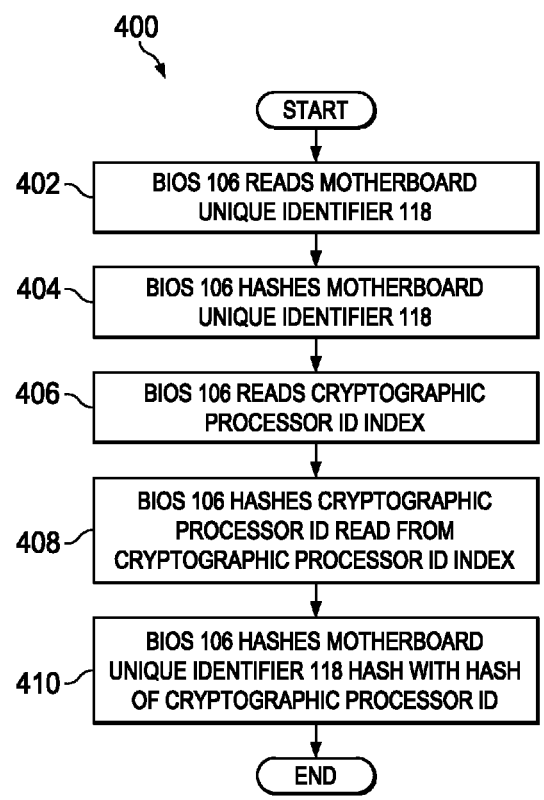
FIG. 4 illustrates a flow chart of an example method for calculating a binding secret, in accordance with embodiments of the present disclosure.

FIG. 4 illustrates a flow chart of an example method 400 for calculating a binding secret, in accordance with embodiments of the present disclosure. In some embodiments, method 400 may be performed or executed in whole or part by BIOS 106 (executing on processor 103). According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, BIOS 106 may read motherboard unique identifier 118 associated with motherboard 116. At step 404, BIOS 106 may generate a hash for motherboard unique identifier 118 using any suitable hashing technique.

At step 406, BIOS 106 may read the cryptographic processor identifier from the cryptographic processor identifier index of non-volatile memory 111. At step 408, BIOS may generate a hash for the cryptographic processor identifier using any suitable hashing technique.

At step 410, BIOS 106 may perform a hash based on the hash of motherboard unique identifier 118 and the hash of the cryptographic processor identifier in order to generate the binding secret. Such binding secret, once calculated, may be stored within the binding secret index.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using any BIOS 106 or any other system, device, or apparatus operable to implement method 400. In certain embodiments, method 400 may be implemented partially or fully in software and/or firmware embodied in computer-readable media.

In some embodiments, an authorized user (for example, the manufacturer or other provider of information handling system 102) may unbind cryptographic processor 110 from motherboard 116, thus allowing flexibility for reuse of cryptographic processor 110 in the event of an upgrade or downgrade of either of cryptographic processor 110 or motherboard 116.

The methods and systems herein described may provide a secure, two-way binding for a modular cryptoprocessor, while using industry-standard commands and functions (e.g., TPM), and/or without requiring storage external to a cryptoprocessor, thus permitted cryptographic processors to be certified according such industry standards. These methods and systems may also do so in a way that does not impact other platform security applications and cryptographic processor firmware.

Although the disclosed embodiments have been described in detail, it should be understood that various changes, substitutions and alterations can be made to the embodiments without departing from their spirit and scope.

What is claimed is:

1. An information handling system, comprising:
   a microprocessor coupled to a motherboard;
   a random access memory coupled to the microprocessor;
   a basic input/output system (BIOS) comprising a program of BIOS instructions, embodied in non-transitory computer readable media; and
   a cryptoprocessor, comprising a cryptographic processor, coupled to the microprocessor and the BIOS;
   wherein the BIOS instructions, when read and executed by a processor, cause the processor to perform BIOS operations comprising:
      calculating a cryptoprocessor identifier based on a hash of:
         a serial number of the cryptoprocessor; and
         a random number generated by the cryptoprocessor;
      calculating a binding secret value based on:
         a unique identifier of the motherboard; and
         the cryptoprocessor identifier;
      creating a binding secret index to receive and store the binding secret value in a portion of a non-volatile memory integral to the cryptoprocessor;
      determining whether the cryptoprocessor is bound to the motherboard;
      responsive to determining that the cryptoprocessor is bound to the motherboard, performing validation operations comprising:
         reading a previous binding secret value stored in the non-volatile memory using the binding secret index;
         comparing the binding secret value and the previous binding secret value; and
         responsive to detecting a match between the binding secret value and the previous binding secret value, validating a binding of the cryptoprocessor to the motherboard.

2. The information handling system of claim 1, wherein the previous binding secret value is permanently locked in the binding secret index.

3. The information handling system of claim 1, wherein determining whether the cryptoprocessor is bound to the motherboard includes:
   determining whether a value read from the binding secret index has any one of one or more predetermined values, wherein the one or more predetermined values include an all 0 value, in which all bits of the value read from the binding secret index are 0, and an all 1 value, in which all bits of the value read from the binding secret index are 1.

4. The information handling system of claim 1, wherein the BIOS operations include:
   responsive to determining that the cryptoprocessor is not bound to the motherboard, performing binding activation operations comprising:
      writing the binding secret value to the binding secret index;
      write and read protecting the binding secret index by a physical presence provision in the cryptoprocessor; and
      determining whether the writing of the binding secret value was successful.

5. The information handling system of claim 4, wherein the BIOS operations include:
   responsive to determining that either the writing of the binding secret value was unsuccessful or the binding secret value did not match the previous binding secret value, performing disabling operations comprising:
      disabling the cryptoprocessor;
      rebooting the information handling system; and
      generating a binding error alert.

6. The information handling system of claim 5, wherein rebooting the information handling system includes:
   rebooting the information handling system without cryptoprocessor support.

7. The information handling system of claim 1, wherein the cryptoprocessor comprises a Trusted Platform Module compliant with a Trusted Computing Group standard.

8. A method comprising BIOS operations performed by a basic input output system (BIOS) of an information handling system, wherein the BIOS operations include:
   calculating a cryptoprocessor identifier based on a hash of:
      a serial number of the cryptoprocessor; and
      a random number generated by the cryptoprocessor;
   calculating a binding secret value based on:
      a unique identifier of the motherboard; and
      the cryptoprocessor identifier;
   creating a binding secret index to receive and store the binding secret value in a portion of a non-volatile memory integral to the cryptoprocessor;
   determining whether the cryptoprocessor is bound to the motherboard;
   responsive to determining that the cryptoprocessor is bound to the motherboard, performing validation operations comprising:
      reading a previous binding secret value stored in the non-volatile memory using the binding secret index;
      comparing the binding secret value and the previous binding secret value; and responsive to detecting a match between the binding secret value and the previous binding secret value, validating a binding of the cryptoprocessor to the motherboard.

9. The method of claim 8, wherein the previous binding secret value is permanently locked in the binding secret index.

10. The method of claim 8, wherein determining whether the cryptoprocessor is bound to the motherboard includes:
determining whether a value read from the binding secret index has any one of one or more predetermined values, wherein the one or more predetermined values include an all-0 value in which all bits of the value read from the binding secret index are 0 and an all-1 value in which all bits of the value read from the binding secret index are 1.

11. The method of claim 10, wherein the BIOS operations include:
responsive to determining that the cryptoprocessor is not bound to the motherboard, performing binding activation operations comprising:
writing the binding secret value to the binding secret index;
write and read protecting the binding secret index by a physical presence provision in the cryptoprocessor; and
determining whether the writing of the binding secret value was successful.

12. The method of claim 11, wherein the BIOS operations include:
responsive to determining that either the writing of the binding secret value was unsuccessful or the binding secret value did not match the previous binding secret value, performing disabling operations comprising:
disabling the cryptoprocessor;
rebooting the information handling system; and
generating a binding error alert.

13. The method of claim 12, wherein rebooting the information handling system includes:
rebooting the information handling system without cryptoprocessor support.

14. The method of claim 8, wherein the cryptoprocessor is a modular component readily removable from the motherboard once coupled to the motherboard.

15. The method of claim 8, wherein the cryptoprocessor comprises a Trusted Platform Module compliant with a Trusted Computing Group standard.

16. An article of manufacture comprising:
a non-transitory computer-readable medium; and
processor-executable basic input output system (BIOS) instructions carried on the non-transitory computer-readable medium, wherein the BIOS instructions, when read and executed by a processor, cause the microprocessor to perform BIOS operations comprising:
calculating a cryptoprocessor identifier based on a hash of:
a serial number of the cryptoprocessor; and
a random number generated by the cryptoprocessor;
calculating a binding secret value based on:
a unique identifier of the motherboard; and
the cryptoprocessor identifier;
creating a binding secret index to receive and store the binding secret value in a portion of a non-volatile memory integral to the cryptoprocessor;
determining whether the cryptoprocessor is bound to the motherboard;
responsive to determining that the cryptoprocessor is bound to the motherboard, performing validation operations comprising:
reading a previous binding secret value stored in the non-volatile memory using the binding secret index;
comparing the binding secret value and the previous binding secret value; and
responsive to detecting a match between the binding secret value and the previous binding secret value, validating a binding of the cryptoprocessor to the motherboard.

17. The article of claim 16, wherein the previous binding secret value is permanently locked in the binding secret index.

18. The article of claim 16, wherein determining whether the cryptoprocessor is bound to the motherboard includes:
determining whether a value read from the binding secret index has any one of one or more predetermined values, wherein the one or more predetermined values include an all-0 value in which all bits of the value read from the binding secret index are 0 and an all-1 value in which all bits of the value read from the binding secret index are 1.

19. The article of claim 18, wherein the BIOS operations include:
responsive to determining that the cryptoprocessor is not bound to the motherboard, performing binding activation operations comprising:
writing the binding secret value to the binding secret index;
write and read protecting the binding secret index by a physical presence provision in the cryptoprocessor; and
determining whether the writing of the binding secret value was successful.

20. The article of claim 19, wherein the BIOS operations include:
responsive to determining that either the writing of the binding secret value was unsuccessful or the binding secret value did not match the previous binding secret value, performing disabling operations comprising:
disabling the cryptoprocessor;
rebooting the information handling system; and
generating a binding error alert.

21. The article of claim 20, wherein rebooting the information handling system includes:
rebooting the information handling system without cryptoprocessor support.

22. The article of claim 16, wherein the cryptoprocessor is a modular component readily removable from the motherboard once coupled to the motherboard.

23. The article of claim 16, wherein the cryptoprocessor comprises a Trusted Platform Module compliant with a Trusted Computing Group standard.

* * * * *